W. A. FORBES.
FODDER BINDER AND TRUCK.
APPLICATION FILED APR. 24, 1911.
1,015,673.
Patented Jan. 23, 1912.
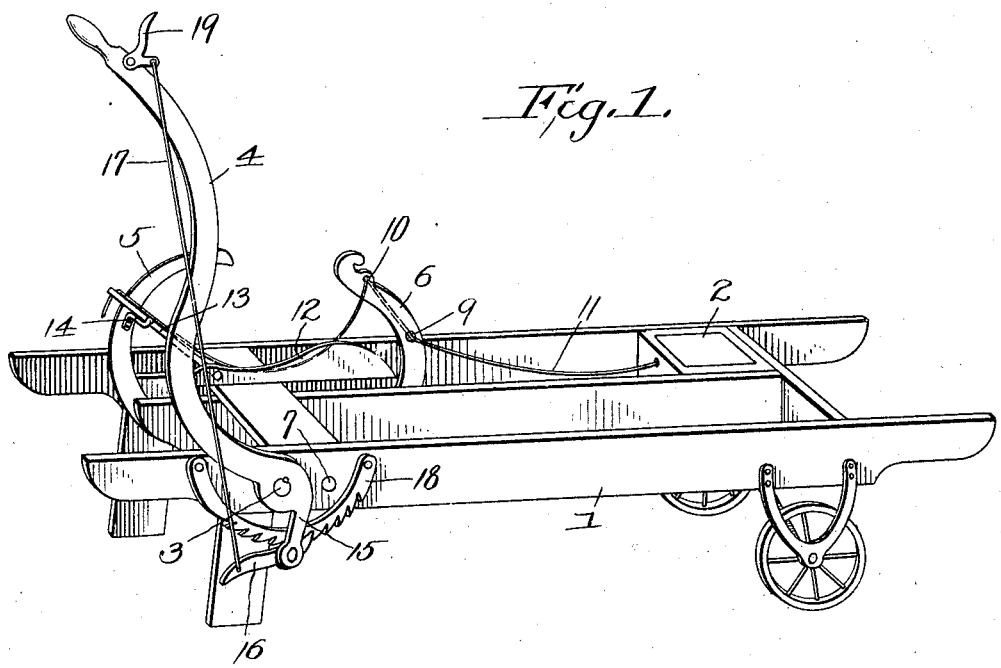
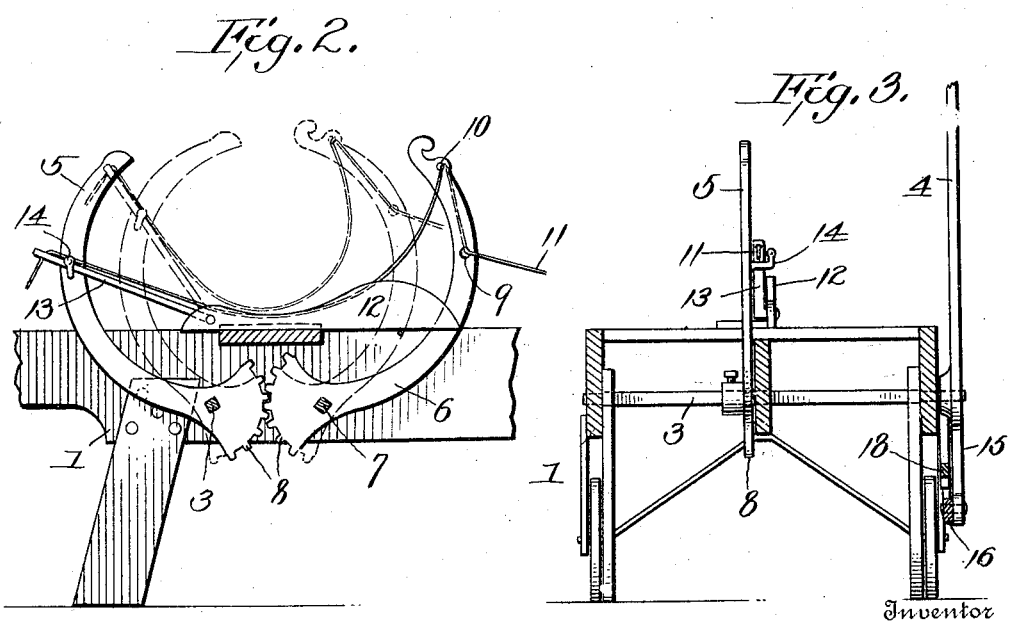
Witnesses
Oliver W. Holmes
E. B. McBath
Inventor
W. A. Forbes
By Chas E Bock
Attorney

UNITED STATES PATENT OFFICE.

WILLIAM A. FORBES, OF BUTLER, OHIO.

FODDER BINDER AND TRUCK.

1,015,673.

Specification of Letters Patent.   Patented Jan. 23, 1912.

Application filed April 24, 1911.   Serial No. 623,025.

*To all whom it may concern:*

Be it known that I, WILLIAM A. FORBES, a citizen of the United States, residing at Butler, in the county of Richland and State of Ohio, have invented new and useful Improvements in Fodder Binders and Trucks, of which the following is a specification.

This is an improvement upon the fodder binder and truck for which Letters Patent were granted to me June 22, 1909, Number 925,470.

The object of this device is to facilitate the pressing and tying of fodder in bundles of a size convenient to be handled.

The invention consists of the novel features of construction hereinafter set forth, pointed out in the claims, and shown in the accompanying drawings, in which:

Figure 1 is a perspective view of the device, the gripping jaws being partly open. Fig. 2 is a side elevation of the bundle gripping mechanism, parts in section, and the jaws being shown in dotted lines. Fig. 3 is a transverse section through the truck, a gripping jaw and an operating lever being shown in edge elevation.

In these drawings 1 represents a suitable portable truck provided at its forward end with a twine box 2, and adjacent its rear end with a transverse shaft 3, upon one end of which is fixed an operating lever 4, and there is also fixed upon said shaft one member of a pair of curved gripping arms 5 and 6. The arm 6, is fixed upon a suitable stub shaft 7, and the lower inner ends of these arms are provided with intermeshing segments 8. The arm 6, is provided with two eyes 9 and 10 and the twine 11, runs from the twine box 2, to the eye 9, and through said eye and then up one side of the arm 6 and through the eye 10. A plate 12, is arranged vertically upon the truck adjacent the two arms and is provided with a combined curved upper edge which forms a rest for the bundle, and said plate also furnishes a support for a rod 13, which is pivotally connected to the rear end of the plate and which rests loosely upon a suitable catch or hook 14, carried by the arm 5. The twine 11, after passing through the eye 10 passes loosely through the suitable eye or other form of opening at the outer end of the rod 13. The lever 4 has at its lower end a downward extension 15 to which is pivoted a pawl 16, one end of which engages a curved rack bar 18 and the other end of which is connected by a suitable rod or wire 17 to a suitable pawl operating lever or bell crank 19 carried upon one side of the outer portion of the lever 4. It will be obvious that as the lever 4 is moved upwardly the shaft 3 will be rotated the arm 5 will move in the same direction as the lever 4, and by meshing with the arm 6 will cause said arm to swing upwardly and rearwardly, thus bringing the two arms toward each other. Movement of the arm 5 will also lift twine carrying rod 13, so that as the bundle is compressed the twine will be held in a position ready to bring over the top and tie.

What I claim is:

1. A device of the kind described comprising a truck having a twine box, two pivoted arms movable toward each other and adapted to grip a bundle, means for operating said arms, one of the arms having two eyes formed therein and the other arm having a hook thereon, and a pivoted rod adapted to be engaged by said hook, the twine running through the eyes of one arm and being loosely secured to the free end portion of the said rod.

2. In a device of the kind described parallel shafts, a lever for operating one of said shafts, arms fixed upon said shafts, said arms having toothed segment portions meshing with each other, a rod pivoted between said arms, and means carried by one of the arms for engaging said rod and moving it in unison with the arm, one of the arms having eyes through which twine passes, the twine being secured to said rod, as and for the purpose set forth.

3. A device of the kind described comprising a portable truck having a twine box, transverse shafts, arms mounted upon said shafts, said arms having intermeshing segmental portions, one of said arms having a plurality of eyes, and the other arm having a laterally extending hook, a vertically arranged plate with a compound curved upper edge, said plate being arranged upon the truck between the arms, a rod pivoted to said plate and engaged by the hook of the arm, a lever fixed to one of said shafts, said lever having a depending portion, a curved rack bar, a plate pivoted to said extension and engaging said rack, and means for operating said pawl, the twine from said box running through the eyes of one of the arms and being secured to the rod engaged by the other arm, as and for the purpose set forth.

WILLIAM A. FORBES.

Witnesses:
   I. SHAFFER,
   W. W. THUMA.